(12) United States Patent
Ricketts et al.

(10) Patent No.: US 9,775,297 B2
(45) Date of Patent: Oct. 3, 2017

(54) BUBBLE UP AUGER FOR AGRICULTURAL COMBINES

(71) Applicant: CNH America LLC, New Holland, PA (US)

(72) Inventors: Jonathan Eugene Ricketts, Coal Valley, IL (US); William Mark McCully, Lancaster, PA (US); Clayton E. Banks, Jr., Brownstown, PA (US)

(73) Assignee: CNH Industrial America LLC, New Holland, PA (US)

( * ) Notice: Subject to any disclaimer, the term of this patent is extended or adjusted under 35 U.S.C. 154(b) by 23 days.

(21) Appl. No.: 13/750,272

(22) Filed: Jan. 25, 2013

(65) Prior Publication Data

US 2014/0213331 A1     Jul. 31, 2014

(51) Int. Cl.
*A01D 17/02* (2006.01)
*A01F 12/46* (2006.01)
*A01D 41/12* (2006.01)
*A01D 61/00* (2006.01)

(52) U.S. Cl.
CPC .......... *A01F 12/46* (2013.01); *A01D 41/1208* (2013.01); *A01D 61/008* (2013.01)

(58) Field of Classification Search
CPC ........ B65G 65/46; B65G 65/40; B65G 65/30; B65G 65/34; B65G 2812/055; B65G 2812/0544; A01K 5/0225; A01D 41/1217
USPC ....... 198/313, 666, 676, 583, 588, 317, 812; 460/59, 114; 56/330
See application file for complete search history.

(56) References Cited

U.S. PATENT DOCUMENTS

| | | | | |
|---|---|---|---|---|
| 2,630,906 | A * | 3/1953 | Philipp | 198/550.1 |
| 3,070,221 | A | 12/1962 | Bobrowski | |
| 3,132,459 | A | 5/1964 | Grillot | |
| 3,299,855 | A | 1/1967 | Buschbom | |
| 3,872,982 | A * | 3/1975 | Rowland-Hill | A01D 41/1217 198/550.1 |
| 3,938,683 | A * | 2/1976 | Bichel | B60P 1/40 414/502 |
| 3,945,484 | A * | 3/1976 | Oury | 198/313 |
| 3,963,112 | A | 6/1976 | Crego | |
| RE29,110 | E * | 1/1977 | Oury | 198/314 |
| 4,008,819 | A | 2/1977 | Hanaway | |
| 4,029,219 | A | 6/1977 | Rutten et al. | |
| 4,074,803 | A | 2/1978 | Kollberg | |
| 4,093,087 | A * | 6/1978 | DeCoene | A01D 41/1217 198/668 |
| 4,220,242 | A * | 9/1980 | Forsberg | 198/666 |
| 4,714,398 | A * | 12/1987 | Rohwedder | 414/503 |
| 4,800,902 | A * | 1/1989 | Maust | 460/59 |
| 5,143,202 | A * | 9/1992 | Lehmann et al. | 198/670 |
| 5,318,444 | A | 6/1994 | Kuzub et al. | |
| 5,511,925 | A | 4/1996 | Muth | |

(Continued)

FOREIGN PATENT DOCUMENTS

DE          4419435 A1   12/1995

*Primary Examiner* — Árpád Fábián-Kovács
(74) *Attorney, Agent, or Firm* — Patrick M. Sheldrake (57) ABSTRACT

A bubble up auger includes a tubular housing, a screw auger and a baffle. The tubular housing includes an inlet opening having a first width end adjacent a first end of the tubular housing and a second width end opposite the first width end. The baffle extends from the inlet opening, outwardly from the central longitudinal axis of the tubular housing and towards the first end of the tubular housing.

11 Claims, 5 Drawing Sheets

(56) References Cited

U.S. PATENT DOCUMENTS

| | | | |
|---|---|---|---|
| 5,615,989 A | 4/1997 | Matousek et al. | |
| 5,695,399 A * | 12/1997 | Carlson | A01D 41/1208 |
| | | | 414/505 |
| 6,358,143 B1 | 3/2002 | Hurlburt | |
| 6,367,234 B1 * | 4/2002 | Hurlburt | A01D 41/1217 |
| | | | 460/114 |
| 7,461,763 B1 | 12/2008 | Winn | |
| 7,621,113 B2 | 11/2009 | Blakeslee et al. | |
| 7,806,757 B2 * | 10/2010 | Coers et al. | 460/114 |
| 7,971,702 B2 * | 7/2011 | Johnsgaard | 198/550.1 |
| 8,146,974 B2 | 4/2012 | Horst | |
| 8,470,183 B2 * | 6/2013 | DeWaard | 210/803 |
| 2010/0083850 A1 | 4/2010 | Salda | |
| 2011/0100930 A1 * | 5/2011 | DeWaard | 210/787 |

\* cited by examiner

BUBBLE UP AUGER FOR AGRICULTURAL COMBINES

BACKGROUND OF THE INVENTION

The present invention relates generally to a conveying auger for agricultural combines. In particular, the present invention relates to a bubble up auger having an improved inlet opening for improving efficiency in the amount of grain transported through the auger.

Mechanical harvesting of grain has taken place for decades. However, efforts continue in the attempt to make harvesting operations more efficient and effective. A combine harvester generally includes a header which cuts the crop. The header then moves the cut crop into a feeder house. The feeder house lifts the cut crop into the threshing, separation and cleaning areas of the agricultural combine. The grain is separated from crop stalk by a rotor or threshing system. The grain is then cleaned, transported, and stored in a grain tank. The chaff and trash are deposited from the rear of the agricultural combine. The grain stored in the grain tank is eventually discharged through a grain tank unloader tube. An operator usually runs these various operations from a glass-enclosed cab.

Grain processed through the threshing and separating system then enters a clean grain elevator typically positioned on one side of the combine. The elevator is an endless chain elevator with a series of lift arms attached to the chain. The arms lift the grain upwards. Near the top of the elevator the grain is deposited to a base of a bubble up auger. The bubble up auger moves the grain towards the center of the grain tank. At the end of the bubble up auger the grain is discharged into the grain tank's center. Conventional bubble up augers are hinged near the base of the auger so that the auger can rotate or pivot to a transport, or substantially horizontal position. To discharge the grain from the grain tank, there is an auger, or augers positioned at the bottom of the grain tank. This grain tank auger moves grain to a grain tank unloading auger. The grain tank unloading auger is extended away from the grain tank and discharges the grain into a nearby transport vehicle.

Conventional bubble up augers, however, have a relatively small inlet opening formed by the walls of a tubular housing of the auger. Furthermore, given the auger inclination angle when the bubble up auger is in a harvest or inclined position, significant void space within the auger results and thereby reduces conveying efficiency compared to an auger operating in a transport or substantially horizontal position. Therefore, it is advantageous to increase the conveying efficiency of the bubble up auger without increasing the speed or diameter of the auger. An increase in auger speed increases grain damage, wear on the auger, and maintenance costs. An increase in auger diameter increases weight and cost.

Thus, there is still a need for a bubble up auger capable of increasing or maximizing its throughput and efficiency. Such a need is satisfied by the bubble up auger of the present invention.

BRIEF SUMMARY OF THE INVENTION

In accordance with a preferred embodiment, the present invention provides a bubble up auger for conveying crop material on an agricultural combine. The bubble up auger includes a tubular housing, a screw auger and a baffle. The tubular housing includes a first end pivotably connected to a support structure and a second end opposite the first end, and an inlet opening. The inlet opening is formed about the first end of the tubular housing for receiving a flow of crop material. The inlet opening has a first width end adjacent the first end of the tubular housing, and a second width end opposite the first width end. The tubular housing also includes an outlet opening about the second end for discharging crop material. The screw auger is positioned within the tubular housing for conveying crop material between the first and second ends. The baffle extends from the tubular housing adjacent the inlet opening, outwardly from the central longitudinal axis of the tubular housing and towards the first end of the tubular housing.

In accordance with another aspect, the present invention provides a bubble up auger for conveying crop material on an agricultural combine that includes a tubular housing, a screw auger and a baffle. The tubular housing has a first end pivotably connected to a support structure and a second end opposite the first end, an inlet opening about the first end of the tubular housing for receiving a flow of crop material, and an outlet opening about the second end for discharging crop material. The screw auger is positioned within the tubular housing for conveying crop material between the first and second ends. The baffle extends from the tubular housing adjacent the inlet opening. The baffle also extends outwardly from a central longitudinal axis of the tubular housing and towards the first end of the tubular housing. The inlet opening includes a proximal end adjacent the first end of the tubular housing and a distal end opposite the proximal end. The baffle is also configured to be positioned adjacent the distal end of the inlet opening.

In accordance with yet another aspect, the present invention provides a bubble up auger for conveying crop material on an agricultural combine that includes a tubular housing and a screw auger. The tubular housing has a first end pivotably connected to a support structure and a second end opposite the first end, a rectangular shaped inlet opening about the first end of the tubular housing for receiving a flow of crop material, and an outlet opening about the second end for discharging crop material. The screw auger is within the tubular housing for conveying crop material between the first and second ends. The bubble up auger further includes a means for increasing an efficiency of an amount of material transported through the bubble up auger at fixed auger speed.

BRIEF DESCRIPTION OF THE SEVERAL VIEWS OF THE DRAWINGS

The foregoing summary, as well as the following detailed description of a preferred embodiment of the invention will be better understood when read in conjunction with the appended drawings. For the purpose of illustrating the invention, there are shown in the drawings an embodiment which is presently preferred. It should be understood, however, that the invention is not limited to the precise arrangements and instrumentalities shown.

In the drawings.

DETAILED DESCRIPTION OF THE INVENTION

Reference will now be made in detail to a preferred embodiment of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain" and "crop material" are used throughout the specification for convenience and it should be understood that these terms are not intended to be limiting. Thus, "grain" refers to that part of a crop which is harvested and separated from discardable portions of the crop material.

Figure 1:
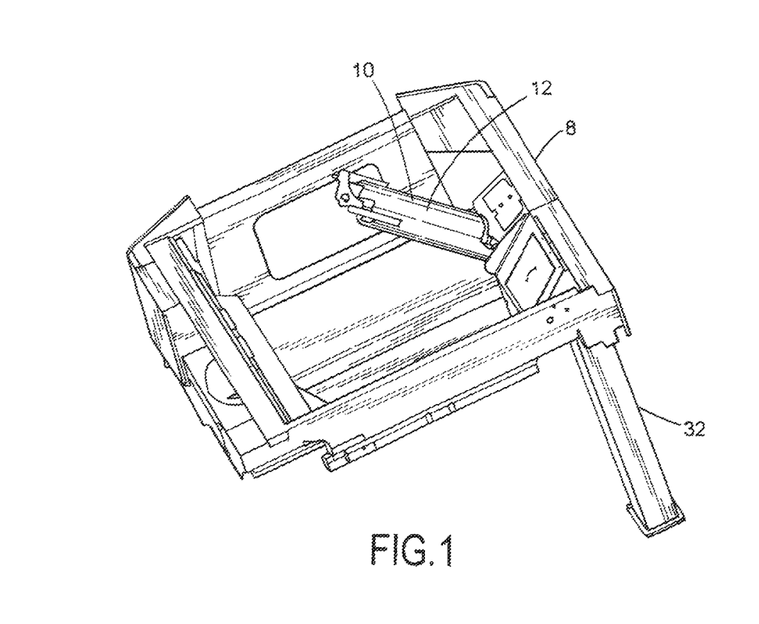
FIG. 1 is a perspective view of a bubble up auger and a support frame of a grain tank of an agricultural combine in accordance with a preferred embodiment of the present invention.
Figure 2:
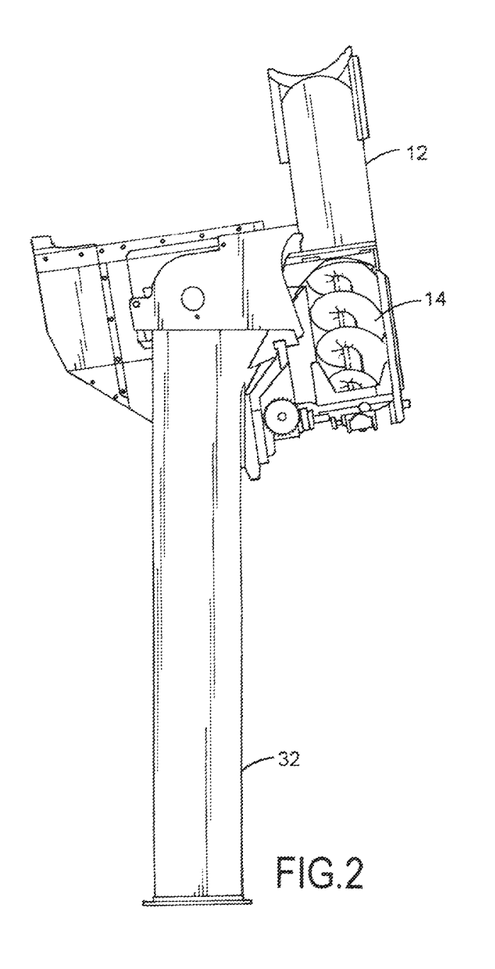
FIG. 2 is a perspective view of a base end of the bubble up auger of FIG. 1.

Referring now to the drawings, wherein a preferred embodiment of the present invention is shown, FIGS. 1-7 illustrate a bubble up auger 10 for conveying crop to a grain tank. Referring to FIG. 1, the bubble up auger 10 is pivotably connected to a support structure or frame 8 of the grain tank. A grain elevator 32 is also connected to the support structure 8 for feeding grain to the bubble up auger 10. In other words, the grain elevator 32 outputs grain to an inlet opening of the bubble up auger 10.

Figure 6:
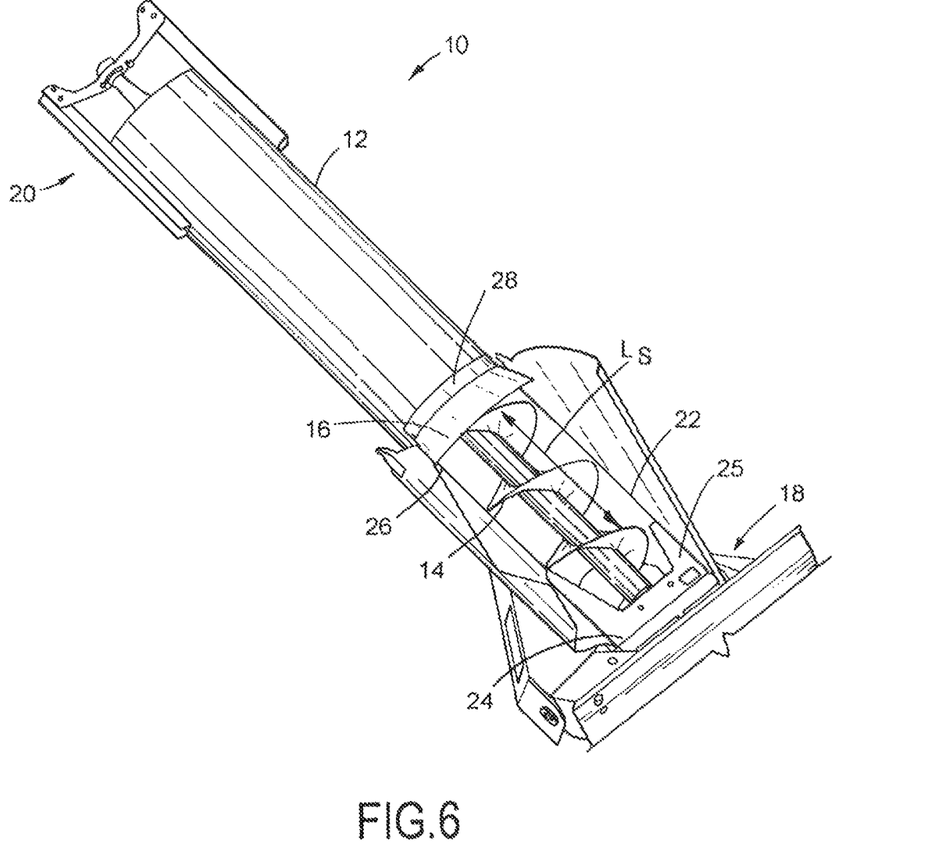
FIG. 6 is a top perspective view of the bubble up auger of FIG. 1.

Referring to FIG. 6, the bubble up auger 10 includes a tubular housing 12, a screw auger 14 and a baffle 16. The tubular housing 12 includes a first end 18 and a second end 20 opposite the first end 18. The screw auger 14 is positioned within the tubular housing 12 for conveying crop material, such as grain, between the first and second ends 18, 20. The screw auger 14 is an elongated spiral screw auger as readily known in the art. As such, a detailed description of its structure, function and operation is not necessary for a complete understanding of the present invention. However, exemplary screw augers and features of conventional bubble up augers applicable to the present invention are disclosed in U.S. Pat. Nos. 8,146,974 and 3,070,221, the entire disclosures of which are hereby incorporated by reference in their entirety. The screw auger 14 is configured in end to end relation within the tubular housing 12 and conveys grain from the first end 18 (or inlet end) of the tubular housing 12 to the second end 20 (or outlet end) of the tubular housing 12.

Figures 4, 5:
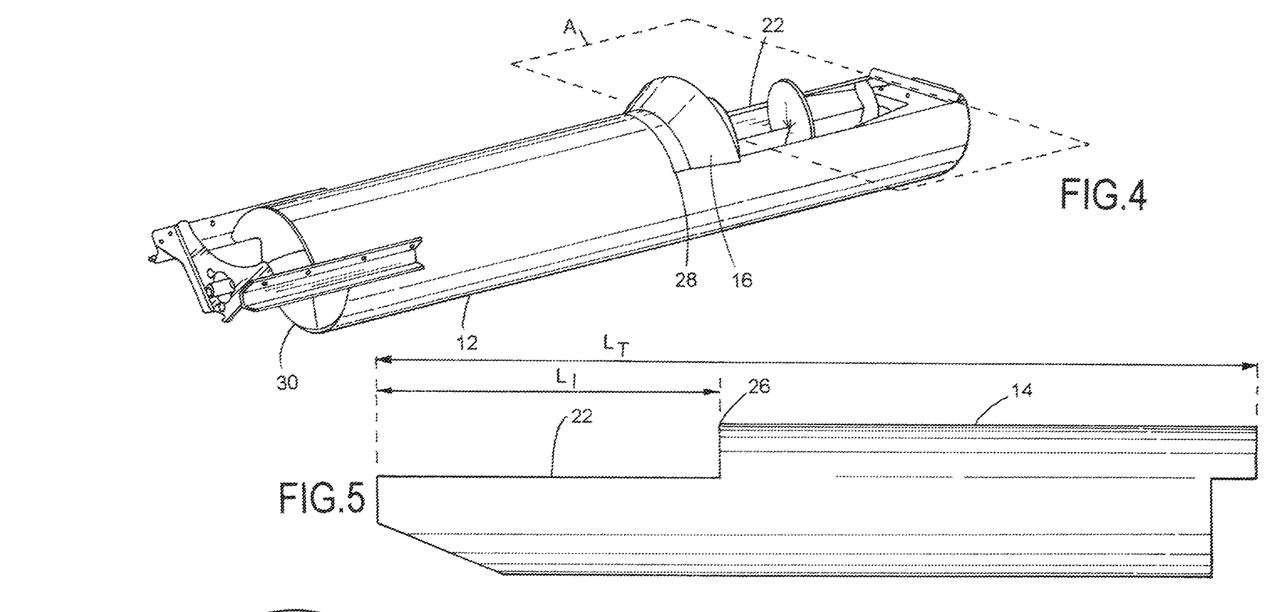
FIG. 4 is another perspective view of the bubble up auger of FIG. 1.
FIG. 5 is a side elevation view of a tubular housing of the bubble up auger of FIG. 1.
Figure 5A:
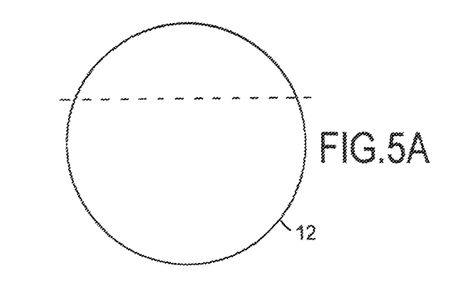
FIG. 5A is a front elevation view of the tubular housing of FIG. 5.

The tubular housing 12 also includes an inlet opening 22 and preferably a substantially rectangular shaped inlet opening 22 and an outlet opening 30 (FIG. 4) for discharging grain. The rectangular shaped inlet opening 22 is configured as shown in FIG. 5 and in fluid communication with the outlet opening 30. The rectangular shaped inlet opening 22 has a rectangular cross-section and is formed by a rectangular shaped cut (plane A of FIG. 4) extending longitudinally through the tubular housing 12 and then removing material of the tubular housing 12 above the cut. Preferably, the rectangular shaped cut extends through a circular cross-section of the tubular housing 12 substantially perpendicular to a longitudinal axis of the tubular housing 12 in a chord like fashion, as shown in FIG. 5A. That is, the rectangular shaped inlet opening 22 extends substantially parallel to a central longitudinal axis of the tubular housing 12. Further, the rectangular shaped cut extends through the circular cross-section at a height of about ½ to ¾ of the overall height of the tubular housing 12. The rectangular shaped inlet opening 22 is formed about the top ½ to ¼ of the tubular housing 12.

Referring to FIGS. 5 and 6, the rectangular shaped inlet opening 22 extends a length $L_I$ extending in a direction of its longitudinal axis about 30% to 50% of the overall length $L_T$ of the tubular housing 12, and preferably about 35% to 45% of the overall length $L_T$ of the tubular housing 12, and more preferably about 40% of the overall length $L_T$ of the tubular housing 12. Additionally, the rectangular shaped inlet opening 22 can be configured to extend a length $L_I$ extending in a direction of its longitudinal axis a length equal to or greater than a length of three full rotations of the screw auger 14 and preferably a length of two full rotations of the screw auger 14 (FIG. 6). In other words, the overall length $L_I$ of the rectangular shaped inlet opening 22 is at least as long as a length $L_S$ defined by two full rotations of the screw auger 14, but can alternatively be more than length $L_S$ defined by two, three or more than three full rotations of the screw auger 14.

The rectangular shaped inlet opening 22 includes a first width end 24 (a proximal end) and a second width end 26 (a distal end) opposite the first width end 24. The first width end 24 is adjacent or proximate the first end 18 of the tubular housing 12. The widths of the first and second width ends 24, 26 are preferably equidistant.

The tubular housing 12 can optionally include a masking plate 25 (FIG. 6) covering a peripheral edge of the rectangular shaped inlet opening 22 about the first width end 24.

Figure 3:
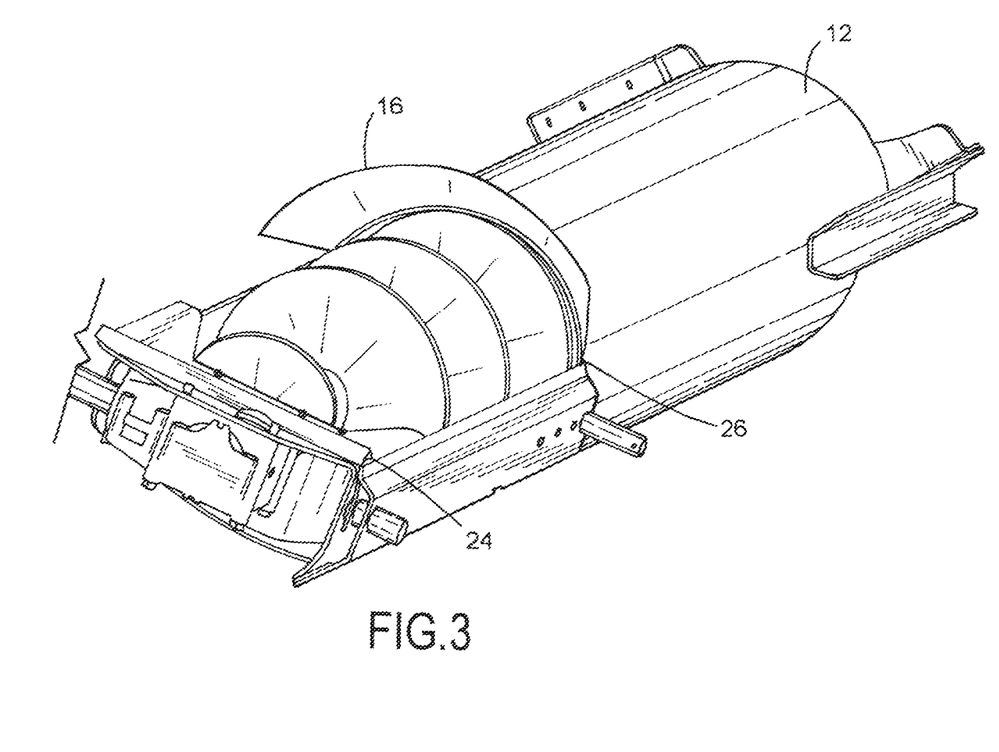
FIG. 3 is an enlarged perspective view of the base end of the bubble up auger of FIG. 1.

The baffle 16 is configured as best shown in FIGS. 3, 4 and 6. The baffle 16 has a substantially semi-circular frustum shape. The baffle 16 also includes a flange 28 extending from an apex end of the substantially semicircular frustum and configured to be congruent with the tubular housing 12 for mounting the baffle 16 thereto. The baffle 16 is connected to and extends from the tubular housing 12 adjacent the second width end 26 of the rectangular shaped inlet opening 22. Further, the baffle 16 extends outwardly from the central longitudinal axis of the tubular housing 12 and towards the first end 18 of the tubular housing 12. Preferably, the baffle 16 extends from an outside surface of the tubular housing 12. The baffle 16 is also configured to be positioned above the inlet opening 22 and above the screw auger 14.

In operation, when the bubble up auger 10 is used for conveying grain within an agricultural combine, grain is fed to the rectangular shaped inlet opening 22 via grain elevator 32. Owing to the relatively increased size of the inlet opening 22 compared to conventional bubble up augers, the bubble up auger 10 can receive and process greater amounts of grain compared to conventional bubble up augers which have relatively smaller sized inlet openings. Once received within the tubular housing 12, the screw auger 14 rotates to convey the grain towards the outlet opening 30 of the bubble up auger 10. Thus, as grain is moved towards the outlet opening 30, any grain within the inlet opening 22 that rises to a level above a top most edge of the tubular housing 12 will be deflected downwardly and radially inwardly due to the baffle 16 (FIG. 7), thereby increasing the amount and rate of grain throughput through the bubble up auger 10 and increasing the overall efficiency of the bubble up auger 10 at a given fixed auger speed.

Figure 7:
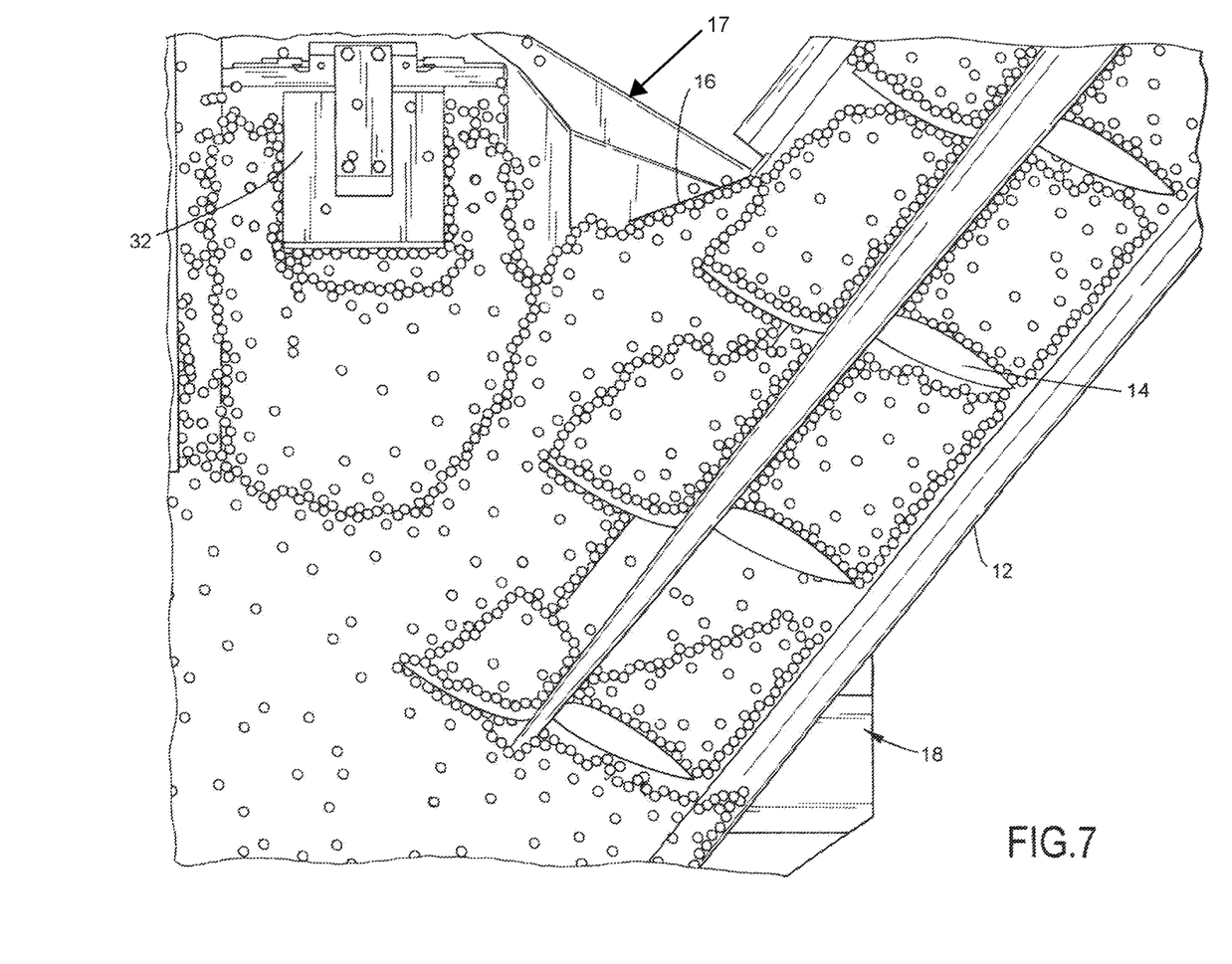
FIG. 7 is partial cross-sectional side elevation view of the bubble up auger of FIG. 1.

Furthermore, referring to FIG. 7, as grain is transported up to the bubble up auger 10 via grain elevator 32, grain is deposited into a chamber 17 into which the base end or first end 18 extends, through the rectangular shaped inlet opening 22. As a result of the bubble up auger 10 inclination angle when positioned in a harvest position, grain levels out due to gravity thereby forming significant voids between auger flights. However, owing to the size of the rectangular shaped inlet opening 22 and the baffle 16 within chamber 17, grain is advantageously deflected into the voids thereby increasing the overall efficiency of the bubble up auger 10.

For example, in computer simulations evaluating efficiencies of conventional bubble up augers compared to the bubble up auger of the present invention, the present invention advantageously resulted in an increase of throughput (e.g., volume per unit time) of about 11% for a given auger speed.

As used herein, efficiency of a bubble up auger refers to an amount of grain transported through the bubble up auger at a given auger speed relative to an ideal, theoretical, anticipated or published performance.

It will be appreciated by those skilled in the art that changes could be made to the embodiment described above without departing from the broad inventive concept thereof. It is to be understood, therefore, that this invention is not limited to the particular embodiment disclosed, but it is intended to cover modifications within the spirit and scope of the present invention as defined by the appended claims.

We claim:

1. A crop conveying system for conveying crop material on an
agricultural combine comprising:
a crop material elevator for generating a crop material output therefrom; a chamber receiving said crop material output; a tubular housing having:
a central longitudinal axis;
a first end positioned adjacent to the crop material elevator and into said chamber for receiving crop material from the crop material elevator and a second end opposite the first end,
an inlet opening in the tubular housing at the first end of the tubular housing, said inlet opening being positioned for receiving the crop material output from the crop material elevator, the inlet opening having:
a first width end adjacent the first end of the tubular housing, a second width end opposite the first width end and spaced from the first width end along a length of the tubular housing, and
a length from the first width end to the second width end in the direction of the central longitudinal axis; and
an outlet opening about the second end for discharging crop material; a screw auger within the tubular housing for conveying crop material between the first and second ends; and
a baffle extending from an outside surface of the tubular housing adjacent the second width end of the inlet opening and in said chamber, the baffle extending outwardly from the tubular housing and the central longitudinal axis of the tubular housing and towards the first end of the tubular housing;
wherein the inlet opening is rectangular shaped and has a length about 35% to 45% of an overall length of the tubular housing.

2. The crop conveying system of claim 1, wherein the inlet opening has a length about 40% of an overall length of the tubular housing.

3. The crop conveying system of claim 1, wherein the inlet is a rectangular shape opening extending through a circular cross section of the tubular housing substantially perpendicular to the longitudinal axis of the tubular housing, wherein the housing at the inlet does not extend beyond the opening.

4. The crop conveying system of claim 1, wherein the baffle is positioned and shaped to deflect crop material above the outside surface of the housing downwardly and radially inwardly toward the inlet.

5. The crop conveying system of claim 1, wherein the baffle is substantially a semi-circular frustum shaped baffle.

6. The crop conveying system of claim 1, in combination with an agricultural harvesting machine, wherein the outlet directs crop material toward a crop material tank of the harvesting machine.

7. An agricultural harvester comprising:
a harvester frame;
a crop material elevator connected to the frame for generating a crop material output therefrom;
a chamber receiving said crop material output; a tank for holding crop material connected to the frame;
a tubular housing connected to the frame and positioned to receive crop material from the crop material elevator, the housing comprising:
a first end positioned adjacent said crop material elevator and into said chamber and a second end opposite the first end,
an inlet opening in a length portion of the tubular housing at the first end of the tubular housing for receiving a flow of crop material from the crop material elevator, the inlet opening having a length between a proximal end thereof adjacent the first end of the tubular housing and a distal end thereof opposite the proximal end and between the proximal end and the second end of the tubular housing; and
an outlet opening about the second end for discharging crop material to the tank; a screw auger within the tubular housing for conveying crop material between the first and second ends; and
a baffle extending from the tubular housing adjacent the distal end of the inlet opening and in said chamber, the baffle extending both outwardly from a central longitudinal axis of the tubular housing and towards the first end of the tubular housing and spanning a portion of the distance between the proximal and distal ends of the inlet opening;.
wherein the inlet opening is rectangular shaped and has a length about 35% to 45% of an overall length of the tubular housing.

8. The agricultural harvester of claim 7, wherein the baffle extends from an outside surface of the tubular housing over the inlet.

9. The agricultural harvester of claim 8, wherein the baffle is substantially a semi-circular frustum shaped baffle.

10. The agricultural harvester of claim 7, wherein the inlet is a rectangular shape opening extending through a circular cross section of the tubular housing substantially perpendicular to the longitudinal axis of the tubular housing, wherein the housing at the inlet does not extend beyond the opening.

11. The agricultural harvester of claim 7, wherein the baffle is positioned above the inlet opening and above the screw auger.

\* \* \* \* \*